No. 814,424. PATENTED MAR. 6, 1906.
J. H. BLETTNER.
COATING.
SPECIMENS. APPLICATION FILED MAR. 21, 1905.
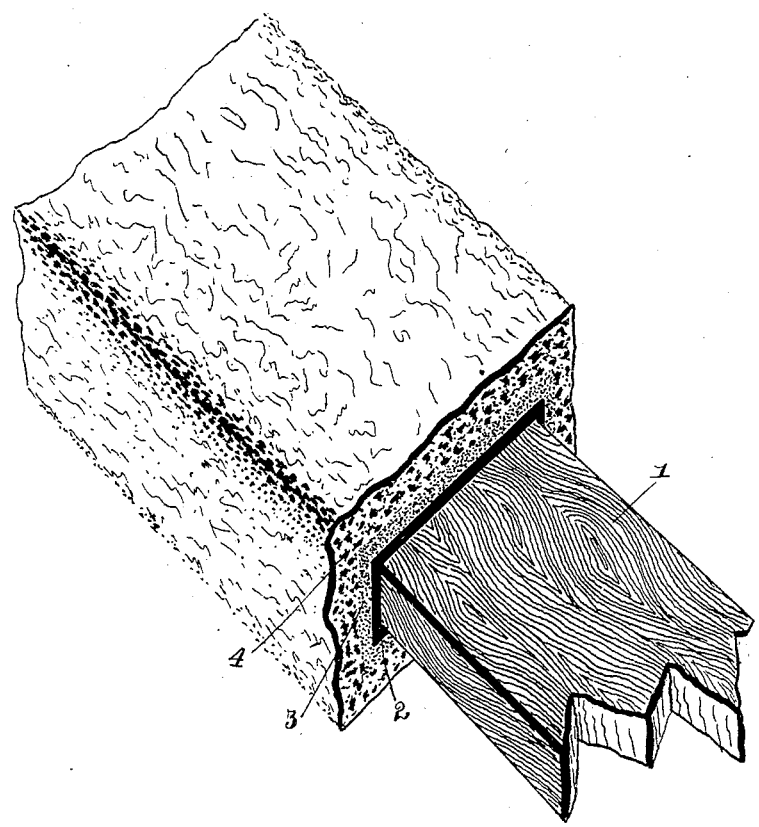
Witnesses:
C. Mortemann
J. H. Butler
Inventor.
John H. Blettner,
by H. C. Evert & Co.
Attorneys.

UNITED STATES PATENT OFFICE.

JOHN HENRY BLETTNER, OF PITTSBURG, PENNSYLVANIA.

COATING.

No. 814,424.

Specification of Letters Patent.

Patented March 6, 1906.

Application filed March 21, 1905. Serial No. 251,223. (Specimens.)

*To all whom it may concern:*

Be it known that I, JOHN HENRY BLETTNER, a citizen of the United States of America, residing at Pittsburg, in the county of Allegheny and State of Pennsylvania, have invented certain new and useful Improvements in Coatings, of which the following is a specification, reference being had therein to the accompanying drawing.

This invention relates to certain new and useful improvements in coatings; and the invention has for its object the provision of a coating which when applied to materials or objects will produce an indurate surface.

Another object of this invention is to combine certain elements which will produce a new composition of matter particularly adapted for coating surfaces that are to be protected and prevented from becoming deteriorated by the forces of nature.

My composition of matter, which will be hereinafter termed a "coating," is particularly adapted for burial-vaults; but in no wise do I care to confine myself to this specific use, as the same may be readily used as a structural material for protecting exposed surfaces and as a coating for receptacles that are to be rendered water and vermin proof.

With the above and other objects in view the invention finally consists in the combination of the various elements which I employ for producing my improved coating, and to demonstrate the manner in which it is applied to surfaces I have illustrated in the accompanying drawing a piece of wood as having my improved coating applied thereto.

As heretofore stated, the coating is particularly adapted for burial-vaults, and when so used I use as a basis or body portion for the vaults wood, preferably cypress, as indicated at 1. This wood is first given a coating of asphaltum and tar 2, the same being applied in a heated and plastic condition. The wood is then treated to a coating of gravel 3, which is applied in a heated state. The heated condition of the gravel 3 and the asphaltum and tar 2 causes the gravel to adhere to the surface of the first coating—namely, asphaltum and tar. A third coating is now applied upon the coatings just described, this third coating consisting of an artificial-stone composition 4. The composition is formed of seven parts, and the ingredients and the proportions of the same used are as follows: Keene's cement, three parts; white sand, one part; water, two parts, and the remaining part is formed by marble-dust, powdered oyster-shells, oxid of zinc, and cream of tartar.

It will be observed that the artificial-stone composition consists of numerous elements and for the most part of cement, which produces an indurate and tenacious surface upon the burial-vault or object being coated.

By first applying a coating of asphaltum and tar the burial-vault is rendered waterproof and by the application of the last coating substantially vermin-proof.

While I have herein described the proportions of the ingredients which I preferably employ, I do not care to confine myself to the exact amount of each ingredient used, as these proportions may be varied according to the grade of the coating desired.

What I claim as new, and desire to secure by Letters Patent, is—

1. The herein-described composition of matter consisting of three parts Keene's cement, one part white sand, two parts water, and one part consisting of marble-dust, powdered oyster-shells, oxid of zinc and cream of tartar.

2. A coating comprising an interior layer of asphaltum and tar, an intermediate layer of gravel, and an outer layer consisting of cement, sand, water, marble-dust, powdered oyster-shells, oxid of zinc and cream of tartar.

In testimony whereof I affix my signature in the presence of two witnesses.

JOHN HENRY BLETTNER.

Witnesses:
K. H. BUTLER,
E. E. POTTER.